Figure 1:
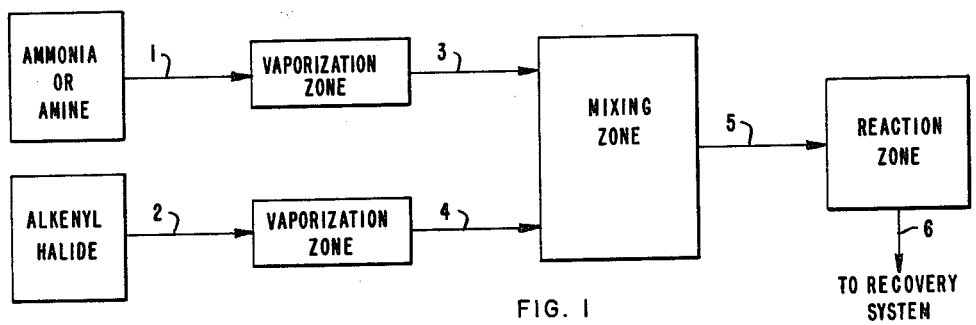

INVENTORS:
ROY E. KOSKI
PETER E. JOHNSON 3,175,009
VAPOR PHASE PRODUCTION OF AMINES
Roy E. Koski, Vallejo, and Peter E. Johnson, Martinez, Calif., assignors to Shell Oil Company, New York, N.Y., a corporation of Delaware
Filed Feb. 15, 1962, Ser. No. 173,460
3 Claims. (Cl. 260—585)

This invention relates to a process for the preparation of unsaturated amines. More particularly, the present invention is concerned with the high temperature vapor phase production of beta,gamma-unsaturated amines.

The reaction of allyl chloride and ammonia in an aqueous solution at a temperature between 97° and 105° C. under pressure to produce mono-, di- and triallyl-amines is known. Such a process is disclosed in U.S. Patent 2,216,548 (October 1, 1940). Isobutenyl amines may be prepared by reacting an isobutenyl chloride with ammonia in the presence of water at temperatures between 80° C. and 250° C. as disclosed in U.S. 2,172,822 (September 12, 1939).

The preparation of alkenyl amines by the reaction of an alkenyl chloride with ammonia has heretofore been accomplished only by liquid phase reactions at relatively low temperatures and with long reaction times. However, in the liquid phase processes of the prior art the alkenyl amines are first formed as the amine hydrohalides and must be converted to the free amines with caustic soda. In addition, high pressure reaction equipment (600–1000 p.s.i.g.) is required and high ammonia recycle rates are necessary. These deficiencies are all obviated by the vapor phase process of the present invention.

It is an object of the present invention to provide a new method for producing beta,gamma-unsaturated amines including alkenyl amines. It is a further object of the present invention to provide a process for the production of beta,gamma-unsaturated amines which will reduce the contact time of the reactants in the reaction zone to a minimum. Another object is to provide a process in which the beta,gamma-unsaturated amines may be readily separated from the side products of the reaction. An additional object is to provide a process which will produce predominantly monoalkenylamines rather than dialkenylamines and trialkenylamines. The secondary and tertiary alkenylamines are produced only in relatively small amounts in the process of the present invention. Still other objects will become apparent from the following detailed description of the invention.

It has now been discovered that these and other objects may be accomplished by the vapor phase reaction of ammonia or an amine with a beta,gamma-unsaturated halide at temperatures of from 600° C. to 1500° C.

The high temperatures which are characteristic of the process of the present invention serve to promote the reaction of the ammonia (or amine) and beta,gamma-unsaturated halide with exchange of amino (—NH$_2$) for halogen without the accompanying saturation of the alkenyl group or disintegration of the unsaturated amines formed in the reaction zone. Furthermore, the desired olefinic amines produced by the reaction are maintained in the vapor state while the ammonium halide and amine hydrohalide by-products form solids which may be easily separated from the gaseous mixture of olefinic amine products. Ammonia may be regenerated from the solid by-products by treatment with a strong alkaline reagent (such as CaO, KOH and NaOH, for example). The ammonia so formed may be recycled to the reaction mixture (if ammonia was originally a reactant) or stored for later use.

The overall reactions which occur in the reaction zone may be expressed by the following equations:

(1) 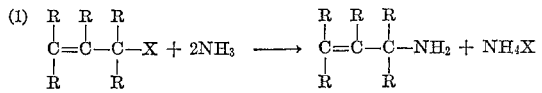

(2) 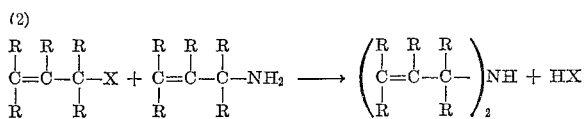

(3) 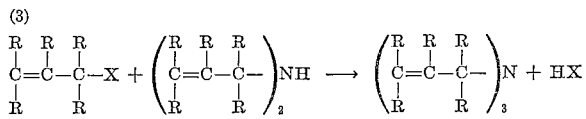

In these equations each R may be the same or different and each is independently selected from the group consisting of the hydrogen atom and an alkyl radical of from 1 to 6 carbon atoms. When R is an alkyl radical, R is preferably a lower alkyl radical (1 to 4 carbon atoms) such as methyl, ethyl, i-propyl, n-propyl, t-butyl, i-butyl, and n-butyl. X represents a halogen atom of atomic number of 9 to 53, inclusive (F, Cl, Br, I). X is preferably one of the halogens of atomic number 17 to 53, inclusive (chlorine, bromine and iodine), and especially a middle halogen (chlorine and bromine).

As shown by Equations 2 and 3, the alkenyl halides react with primary and secondary amines to produce secondary and tertiary amines, respectively. The principal reaction, however, is that shown by Equation 1 if ammonia is present in at least an equimolar amount based on the moles of alkenyl halide. The traces of amine hydrochlorides such which appear as solids in the process of the present invention are formed by the reaction of the amines with the hydrogen halide formed in Equations 2 and 3.

A particularly suitable class of alkenyl halides which may be used as starting materials in the process of the present invention is composed of substituted and unsubstituted allyl halides, i.e., 2-propenyl halides. Compounds such as allyl chloride, allyl bromide, allyl iodide, 3-methyl-2-propenyl chloride (crotyl chloride), 2-methyl-2-propenyl bromide, crotyl bromide, 3-ethyl-2-propenyl iodide, 3-dimethyl-2-propenyl chloride, 2,3-dimethyl-2-propenyl bromide, 2-methyl-3-ethyl-2-propenyl chloride, 3-cyclohexyl-2-propenyl chloride, 3-phenyl-2-propenyl bromide, 3-isopropyl-2-propenyl bromide, and 3-cyclopentyl-2-propenyl chloride are typical examples of alkenyl halides which are suitable starting materials which may be used in the process of the present invention.

The preferred halogenated olefin reactants, including acyclic and alicyclic alkenyl halides, which are used in the process of the present invention are compounds which contain an olefinic bond in the beta,gamma position relative to the halogen atom of a halogenated methyl group, i.e., beta,gamma-alkenyl halides. Suitable beta,gamma-unsaturated alicyclic halides are compounds such as:

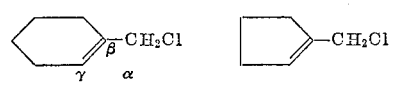

and the corresponding bromides and iodides such as:

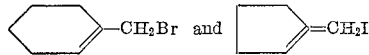

The beta,gamma-unsaturated aliphatic or alicyclic halides which contain from 3 to 15 carbon atoms form a particularly useful class of reactants which can be used in the process of the present invention. A preferred subclass consists of those beta,gamma-unsaturated aliphatic or alicyclic halides of from 3 to 10 carbon atoms in which only a single halogen atom is present in the molecule and wherein said halogen atom is selected from the group consisting of chlorine, bromine and iodine. Ordinarily, the beta,gamma-unsaturated aliphatic or alicyclic halides will contain only one halogen atom per molecule and the rest of the molecule will be composed only of carbon and hydrogen atoms.

The second reactant used in the process of the present invention is preferably ammonia. As shown by Equations 2 and 3, however, it is apparent that primary and secondary amines may also be used in the process. Furthermore, alkyl as well as alkenylamines may be used. If a tertiary amine is used, the reaction proceeds by displacement:

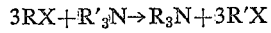
$$3RX + R'_3N \rightarrow R_3N + 3R'X$$

wherein R is an alkenyl radical of from 1 to 15 carbon atoms (preferably containing an allyl linkage) and R' is either an alkenyl or an alkyl radical, each of which may contain from 1 to 15 carbon atoms. Side products may be produced by redistribution

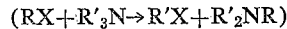
$$(RX + R'_3N \rightarrow R'X + R'_2NR)$$

The general reactions may thus be represented by the chemical equations:

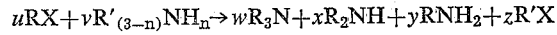
$$uRX + vR'_{(3-n)}NH_n \rightarrow wR_3N + xR_2NH + yRNH_2 + zR'X$$

wherein R and R' have the aforementioned meanings, $n$ is an integer from 0 to 3, inclusive, each value of $n$ giving a separate set of equations, and $u, v, w, x, y$ and $z$ are non-negative integers which are chosen to balance the equation for each value of $n$.

The alkenylamines produced according to the process of the present invention have various uses including curing agents for polyepoxy resins.

Figure 2:
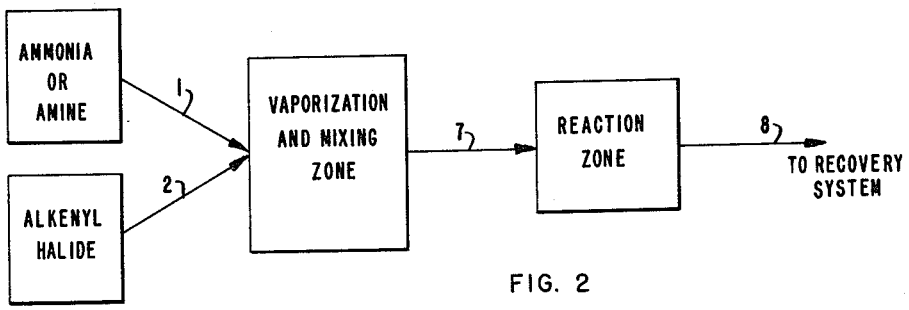
Figure 3:
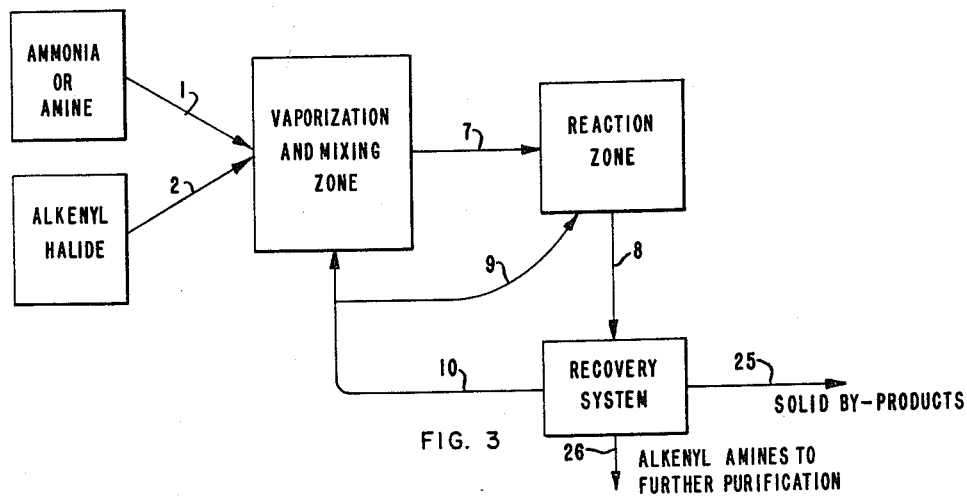
Figure 4:
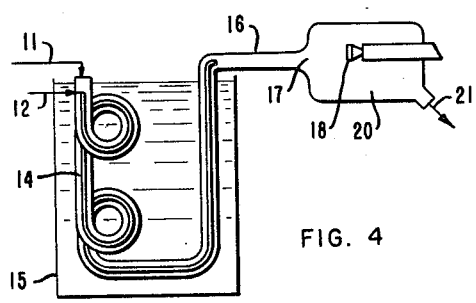

In order that the invention may be more readily understood, the process will be described with reference to the accompanying drawing, wherein FIGS. 1, 2 and 3 illustrate schematically the various stages of the process and FIG. 4 shows a suitable apparatus with which to carry out the process.

In accordance with the invention, as shown in FIG. 1, ammonia or an amine is delivered to a vaporization zone along with an alkenyl halide (lines 1 and 2, respectively). Sufficient heat (from 100° to 500° C.) is applied in the separate Vaporization Zones so that both the alkenyl halide and ammonia (or amine) are converted to the gaseous state. The temperatures in the two zones need not be the same. The reactants are then passed through lines 3 and 4 to a Mixing Zone where the reactants are intimately blended. From the Mixing Zone the mixed reactants are passed through line 5 to a Reaction Zone wherein heat is supplied to the reaction mixture until temperatures of from 600° C. to 1500° C. are attained. The products of the reaction are then immediately passed through line 6 to a Recovery System where the mono-, di- and trialkenylamines are maintained in the vapor state and are easily separated from the solid by-products of the reaction which settle out as a fine powder.

In FIG. 2, a modification is shown in which the vaporization and mixing zones are combined within a single zone. The ammonia (or amine) and alkenyl halide are fed to the combination Vaporization and Mixing Zone via lines 1 and 2, respectively. Heat is applied at the combined Vaporization and Mixing Zone and the gaseous mixture thus formed is delivered through line 7 to a Reaction Zone where the temperature of the mixture is quickly elevated to from 600° C. to 1500° C. The mixture of products from the Reaction Zone is then fed to a suitable Recovery System where the mono-, di- and trialkenylamines are separated from the solid side products. Further separation of the mixture of mono-, di- and trialkenylamines may be achieved by conventional methods such as distillation.

FIG. 3 illustrates still another embodiment of the process of the present invention. The alkenyl halide and ammonia (or amine) are fed to the combination Vaporization and Mixing Zone via lines 1 and 2. The resulting gaseous mixture is delivered to the Reaction Zone through line 7 and the mixture reacts at elevated temperature (600° C. to 1500° C.) to produce the desired alkenylamines. The reaction products are then sent to a Recovery System through line 8. In the Recovery System, solid by-products are removed through line 25 and the alkenylamines are swept through line 26 to be further purified and separated (distillation, for example) into individual compounds. The unreacted ammonia (or amine), alkenyl halide, and some gaseous alkenylamines can be recycled through line 10 back to the Vaporization and Mixing Zone. A portion of the unreacted materials may be sent directly to the Reaction Zone by way of line 9 (take-off from line 10) and may be used to aid in controlling the temperature in the reaction zone.

The reactants may be converted to the gaseous state in the vaporization zone (or the combined vaporizing and mixing zone) by any convenient method of transferring heat to the reactants in sufficient quantity to vaporize the reactants. The reactants may be heated separately, for example, in separate helical tubes immersed in a heated liquid such as oil. When the reactants are vaporized by this method, they enter the mixing zone as gases and may easily be mixed by diffusion, thermal agitation, mechanical mixing, or by any combination of these methods (as when the reactants enter the mixing zone under a moderate pressure of from 100 to 300 p.s.i.g.). Reactants which do not react spontaneously may also be mixed prior to vaporization so that the final mixing step occurs when the reactants are vaporized. In this case the vaporization and mixing zones may be combined. Other methods of mixing and vaporization may also be used. The reactants may be sprayed into a heated mixing zone and simultaneously vaporized and mixed. The reactants may be intermingled in solid or liquid form and vaporized and mixed by a turbulent stream of a hot inert gas. Instead of an inert gas, a hot vapor stream composed of one of the reactants or made up of a mixture of the reactants and products of the reaction may be used both for mixing the additional reactants and for vaporization of the reactants. The reactants may be preheated from about 100° C. to about 500° C. in the vaporization and mixing zones prior to entry into the reaction zone. Even higher temperatures may be used but it is undesirable to elevate the temperature to such an extent that "hot spots" cause the reaction to take place in areas of the mixing or vaporization zones. It is therefore sufficient for the purposes of the present process if the temperature of the vaporized, mixed reactants is kept within the range of from 100° C. to 300° C. prior to entry into the reaction zone. The gaseous reaction mixture is at atmospheric pressure or slightly below atmospheric pressure in the reaction zone itself. The pressure in the reaction zone may be increased to the vapor pressure of the highest boiling reactant. Higher pressure operation in the reaction zone decreases the temperature requirements.

It is also possible to conduct all of the process steps of the present invention in a single unit in which the various zones (as described in FIGS. 1, 2 and 3) are spatially, rather than structurally, separated. When such a system is used, the vaporization zone, the mixing zone and the reaction zone are kept distinct by means of temperature control in the different sections of the unit coupled with control of the velocity of the reactants and reaction products through the unit.

The heat required in the reaction zone for the successful operation of the present invention may be supplied by any convenient method. In many instances the method chosen will depend upon the amount of product which is to be produced. When large amounts of alkenylamines are synthesized, industrial furnaces may be used. Suitable types of industrial furnaces which can supply the temperatures necessary for the reactions according to the process of the present invention include electric arc and induction furnaces, gas fired regenerative furnaces, and blast or reverberatory furnaces of the shaft or bath-type. When it is desired to produce relatively small amounts of the alkenylamines by the high temperature process of the present invention, any of the numerous laboratory-type high-temperature furnaces may be used. Electrically operated muffle furnaces, a spark gap or an electrically heated grid are particularly suitable methods for the small-scale operation of the process. The temperatures required in the reaction zone (600° C. to 1500° C.) may also be obtained simply by heating the reaction zone with an open flame (oxygen with hydrogen, acetylene, natural gas, coal, coke or oil).

The process of the present invention is thermal and does not depend upon a catalyst for successful operation. The process is further characterized by the extremely short residence time of the reactants in the reaction zone of the process. It is only necessary to elevate the reactants to a reaction temperature of between 600° C. and 1500° C. (preferably between 700° C. and 1000° C.) for about one millisecond to about 1 or 2 seconds. This extremely short residence time at elevated temperature has many important advantages over processes with relatively long contact times at lower temperatures. Side reactions are minimized and the decomposition of the alkenylamine products which would be expected to occur at the high temperatures employed in the process of the present invention is almost entirely avoided. The short residence time required in order to complete the reaction makes it possible to send the reactants through the reactor at high velocity and thus increases the amount of alkenylamine which may be produced in a given period of time. The optimum reaction time (residence time of the reactants in the reaction zone at temperatures of from 600° C. to 1500° C.) varies to some extent with the molar ratio of ammonia (or amine) to the alkenyl halide reactant. For the ratios and temperatures (600° C. to 1500° C.) used in the process of the present invention (1 to 200 moles of alkenyl halide per mole of $NH_3$ or amine) a residence time of from .001 to .1 second gives very good results.

As previously stated, the ratio of ammonia (or amine) to alkenyl halide reactant may vary from 1 to 200 moles of ammonia (or amine) per mole of alkenyl halide. When ammonia is one of the reactants, it is desirable to have an excess of ammonia molecules in order to increase the probability that the alkenyl halide will react with the ammonia rather than with amine side products (see reactions (2) and (3)). Ratios of ammonia to alkenyl halide of from 10 to 50 moles of ammonia per mole of alkenyl halide are particularly suitable when a residence time (at a reaction temperature of from 700° C. to 1000° C.) of from .001 to .1 second is employed. A residence time of from .001 to .004 second at a temperature from 800° C. to 950° C. with a molar ratio of from 10 to 40 moles of ammonia per mole of allyl halide has been found to give a high yield of monoallylamine in comparison with the yields of diallylamine and triallylamine. From 15 to 45 moles of monoallylamine per mole of diallylamine or triallylamine were obtained under these reaction conditions. Flow rates of from 2 to 8 grams per minute of ammonia (or amine) and of from .25 to 2 grams of alkenyl halide (preferably allyl halide) per minute are suitable when the apparatus of FIG. 4 is used with a platinum filament wound in a helix which encloses a volume of from .2 to 2 cubic centimeters and which serves as the reaction zone.

Although the process of the present invention is designed to produce a reaction product with only a minor amount of secondary and tertiary alkenylamines, it is possible to increase the amounts of secondary and tertiary amines by recycling the monoalkenylamine back to the reaction chamber and contacting with alkenyl halide. Thus, one of the advantages of the process of the present invention is that it allows selective production of a monoalkenylamine or a dialkenylamine without the concurrent production of the heavier amines. Tertiary amines may also be obtained by recycling the monoalkenylamine back through the reaction zone.

FIG. 4 presents a detailed view of another particular embodiment of the process of the present invention and illustrates an apparatus suitable for carrying out said process. In the process as exemplified by FIG. 4, liquid ammonia (or amine) is fed through line 11 and an alkenyl halide such as allyl chloride, 2-methyl-2-propenyl bromide, 3-dimethyl-2-propenyl chloride, etc.) is fed through line 12 into a concentric tube vaporizer 14 which is immersed in a bath 15 which is filled with any suitable heat exchange media (such as mineral oil, silicones or other non-reactive fluid) and maintained at the desired vaporization temperature (usually from 100° to 300° C.). Vaporization of the ammonia and alkenyl halide occurs in the concentric tube vaporizer and the gases are mixed by turbulent flow in the mixing chamber 16. The mixed gases then contact the heating element 18 of the reaction chamber 17. The heating element 18 (which may be any source of heat which will maintain a temperature of from 600° C. to 1500° C., and preferably from 700° C. to 1000° C.; for example, a spark gap, hot grid, radiating firebrick or radiating metal) is positioned in the reaction chamber 17 so that the mixed gases contact the element in the volume enclosed by the heating element immediately upon emergence from the mixing chamber. The reaction products are then swept through the remaining section of the reaction chamber 20 and delivered to the recovery system through line 21. The reactant side of the system may be kept under pressure using an inert gas such as hydrogen. Pressures from 100 to 500 p.s.i.g. may be employed. Pressures of from 200 to 300 p.s.i.g. are suitable for the apparatus of FIG. 4. By adjustment of the pressure on the unvaporized reactants, the velocity of the reactants through the system may be controlled. In the reaction zone the reactants are at about atmospheric pressure or less and the flow of the reaction products through the system may be controlled by a vacuum pump or by the rate of condensation of the products. Suitable pressures in the reaction zone may range from .01 to 1.5 atmospheres (or at any pressure which maintains the reactants in the vapor state at the reaction temperatures: 600–1500° C.) but it is preferred that the pressure be maintained at from .5 atmosphere to 1.1 atmospheres or at ambient atmospheric pressure. If it is desired to conduct the process under moderate pressure (1 to 10 atmospheres), it is only necessary to maintain a pressure differential between the vaporization zone and the condensation zone in order to control the flow of reactants and products.

The following examples illustrate suitable modes of operating the process of the present invention. It is to be understood, however, that the examples are for the purpose of illustration only and are not to be regarded as limiting the scope of the invention in any manner.

EXAMPLE I

The following preparation was conducted in an apparatus similar to that shown in FIG. 4 but equipped with a platinum filament operated at an orange to yellow glow (about 15 volts) and an impinger located after the reaction zone but before the recovery system. The platinum filament was wound several times and positioned so that any gas entering the area had to pass through the loop. The loop was wound so as to enclose an area the shape of a truncated right cone about .7 cm. high with a base 3.6 cm. in diameter and a top 2.3 cm. in diameter. The volume enclosed by the wire comprises the reaction zone of the apparatus of FIG. 4. A mole ratio of from 30 to 40 moles of ammonia per mole of allyl chloride was used and the vaporizer was maintained at a temperature of 230° F. The individual vapors of allyl chloride and ammonia were combined just prior to reaching the platinum filament. The reaction at the filament was evidenced by the formation of a white solid (mainly ammonium chloride) which formed on the walls of the vessel and carried through to the impinger (not shown). The run was continued for 30 minutes under a pressure of about 250 p.s.i.g. on the unvaporized reactants. The gases from the reactor were led to the impinger and thence to a cold trap immersed in a Dry Ice-acetone bath. The product from the cold trap was evaporated to about 20 ml. in order to remove the excess unreacted ammonia. Ten milliliters of water were added and mixed with the evaporated product. The mixture separated into an upper layer (10.5 ml.) and a lower layer. The lower layer was made alkaline with a pellet of NaOH and then tested on a gas-liquid chromatography apparatus. The resulting chromatogram indicated the presence of both monoallylamine and diallylamine in a molar ratio of 8 moles of monoallylamine to 1 mole of diallylamine.

EXAMPLE II

The procedure of Example I was repeated with a 40:1 molar ratio of ammonia to allyl chloride. The ammonia was fed through the system at a rate of 4.6 grams/minute and the allyl chloride was fed at a rate of 0.5 gram/minute. The vaporizer temperature was maintained at 220° F. As in Example I, the voltage on the platinum filament was maintained at 15 volts and the filament was kept at an orange to yellow glow. The reaction was continued for ten minutes during which time fine white solids were formed and carried through to the impinger (not shown). The solid product was washed with 10 ml. of water into a flask and a pellet of NaOH added. The odor of ammonia was observed. A sample was tested on a gas-liquid chromatography apparatus. Only a slight trace of monoallylamine was found after treatment of the white solid with NaOH. However, a preponderance of ammonia was found, indicating that the allylamines which were formed in the reaction remained in the vapor state with the exit gases.

EXAMPLE III

In this example an apparatus similar to that shown in FIG. 4 and used in Examples I and II was again used. In this modified apparatus the reaction chamber was an explosion pipette which had two electrodes for sparking. The electrodes were operated by a high voltage transformer (approximately 5000 volts A.C.). A one-liter filter flask in an insulated steel bucket with a Dry Ice-acetone mixture was substituted for the cold trap used in Example I. In addition, an ice trap made up of a conventional trap in a De War flask containing ice water was added before the run began. The mole ratio of ammonia to allyl chloride was maintained at approximately 20 to 1. The ammonia was fed through the reaction system at a rate of 4.6 grams per minute. The allyl chloride reactant was fed at a rate of 1.1 ml. per minute (1.03 grams per minute). The total run lasted for 47 minutes. The vaporizer temperature was maintained at about 220° F. and the feed pressure was held at approximately 250 p.s.i.g. The actual pressure in the reaction zone throughout the reaction was atmospheric or slightly below atmospheric pressure. The net product recovery amounted to 355 grams.

Prior to initiation of the reaction the apparatus was flushed out with ammonia for about 30 seconds. The allyl chloride feed was then turned on for about 10 seconds in order to eliminate any air in the lines. Then ammonia was flushed through the reaction chamber for another 30 seconds. The spark mechanism was turned on so that there was a continuous spark discharge in the reaction zone and then the allyl chloride feed was added to the ammonia flowing through the system. The initial mole ratio of ammonia to allylamine was 40 to 1 but was changed to 20 to 1 within 3 minutes to further promote the reaction. The reaction was run in two stages, the first lasting for 22 minutes and the second stage lasting for 25 minutes.

Analysis by gas-liquid chromatography gave the following results:

Analysis of solids—

$$\frac{\text{Moles of ammonia}}{\text{Moles of monoallylamine}} = \frac{250}{1}$$

Analysis of vapor phase—

$$\frac{\text{Moles of monoallylamine}}{\text{Moles of diallylamine}} = \frac{42}{8}$$

$$\frac{\text{Moles of diallylamine}}{\text{Moles of triallylamine}} = \frac{8}{1}$$

(i.e., monoallylamine:diallylamine:triallylamine = 42:8:1)

EXAMPLE IV

The procedure of Example II was repeated with a mole ratio of ammonia to allyl chloride of 20/1. Ammonia was fed through the system at a rate of 4.6 grams per minute and allyl chloride at a 1.1 grams per minute rate. The run lasted 46 minutes. The feed pressure was approximately 260 p.s.i.g. and the reaction pressure was atmospheric. The vaporizer was held at about 222° F. The voltage on the platinum filament was lowered to 12 volts.

The conversion (based on a total allyl chloride feed of 50.7 grams) of allyl chloride to allylamines was approximately 2% (i.e., about one gram of allyl chloride was converted to the mono-, di- and triallylamine). The vapor from the reaction zone contained the following amounts of amine products:

| Compound— | Grams found |
|---|---|
| Monoallylamine | 0.6 |
| Diallylamine | 0.15 |
| Triallylamine | 0.02 |

The molar composition of the solids formed in Examples I–IV were in the following approximate molar ratios:

Ammonium chloride : monoallylamine : diallylamine: triallylamine = 470:1:2:2.

EXAMPLE V

In this example an apparatus similar to that used in Example IV and illustrated by FIG. 4 was employed, but a more complex recovery system was used in order to measure the conversion of the allyl chloride to allylamines. Vapors from the impinger were led directly into a two-liter filter flask buffer bottle which was connected in series to another filter flask containing distilled water and to a third flask open to the atmosphere. The last two flasks were immersed in an ice bath and a Dry Ice acetone bath, respectively, and were connected through a vapor trap.

The ratio of ammonia to allyl chloride in this example was held between 20 and 40 moles of ammonia per mole of allyl chloride. The filament was operated at 14 volts. Ammonia was fed through the system at a rate of 4.6 grams per minute and allyl chloride was fed at a rate of 1.1 grams per minute. The vaporizer temperature was about 220° F. with a feed pressure of 250 p.s.i.g. and a reaction pressure equal to the atmospheric pressure. The process was operated continuously for 120 minutes.

The results of the analysis of the products in the vapor phase of the reaction mixture are given in Table I. The percent conversions of the total moles of allyl chloride used in the process to the corresponding allylamines is shown in Table II and the figures are calculated from the equation:

Percent conversion=

$$\frac{\text{Equivalent moles of allyl chloride} \times 100}{\text{Total moles of allyl chloride}}$$

Solid products formed in the reaction had the following molar composition, expressed as molar ratios:

NH₃ : monoallylamine : diallylamine : triallylamine
131.9 :         1          :      1.4         :       1.8

Table II shows that approximately 10% of the total moles of allyl chloride fed to the reaction zone reacted to form allylamines. Furthermore, of the allylamines formed, approximately 90% was present as the monoallylamine.

Table I

PRODUCT RECOVERY

| Compound | Recovered Weight in Grams | Molecular Weight | Moles | Equivalent Moles of Allyl Chloride |
|---|---|---|---|---|
| Allyl chloride (unreacted) | 77.7 | 76.5 | 1.016 | 1.016 |
| Monoallylamine | 6.5 | 57.1 | 0.114 | 0.114 |
| Diallylamine | 0.3 | 97.2 | 0.003 | 0.006 |
| Triallylamine | 0.2 | 137.2 | 0.001 | 0.003 |
| Unknowns | 0.6 | ¹76.5 | 0.008 | 0.008 |
|  |  |  | Total moles of allyl chloride fed to system | 1.147 |

¹ The Unknowns were predominantly chlorides and were assumed to have the same molecular weight as allyl chloride.

Table II

PERCENT CONVERSION OF ALLYL CHLORIDE

| Amine Product | Percent of Total Allyl Chloride Feed Converted |
|---|---|
| Monoallylamine | 9.08 |
| Diallylamine | 0.57 |
| Triallylamine | 0.29 |
| Total percent conversion | 9.94 |

We claim as our invention:

1. A vapor phase process for producing mono-allyl amine as the major product which comprises,
   (1) vaporizing allyl chloride,
   (2) contacting the vaporized allyl chloride with ammonia vapor to form a mixture containing between 1 and 200 moles of ammonia per mole of allyl chloride,
   (3) exposing said mixture to a temperature of 600° to 1500° C. and a pressure of 0.01 to 1.5 atmospheres for 0.001 to 0.1 second, and
   (4) withdrawing reacted mixture containing monoallyl amine with only minor amounts of di- and tertiary allyl amines.

2. A process according to claim 1 wherein the reaction is carried out with a mixture containing 10 to 50 moles of ammonia per mole of allyl chloride at 700° to 1000° C. under a pressure of 0.01 to 1.5 atmospheres in the reaction zone, and the amine product is withdrawn in the vapor state and separated from the solid by-products produced.

3. A process for the vapor phase production of allylamines which comprises
   (1) vaporizing ammonia and allyl halide, wherein the halogen is middle halogen,
   (2) mixing the vaporized ammonia and said allyl halide in the vapor state to form a reaction mixture,
   (3) exposing said reaction mixture to a temperature of from 600° C. to 1500° C. and a pressure of 0.01 to 1.5 atmospheres for a period of time from one millisecond to two seconds to form a gaseous mixture of allylamines and solid by-products,
   (4) recovering the allylamine products.

References Cited by the Examiner

UNITED STATES PATENTS 2,172,822  9/39  Tamele et al. _____ 260—585
2,435,621  2/48  Brooks et al. _____ 260—585

CHARLES B. PARKER, *Primary Examiner.*